3,161,645
1-(1-AROYLPROPYL-4-PIPERIDYL)-2-BENZIMID-
AZOLINONES AND RELATED COMPOUNDS
Paul Adriaan Jan Janssen, Vosselaar, near Turnhout, Belgium, assignor to Research Laboratorium Dr. C. Janssen N.V., a corporation of Belgium
No Drawing. Filed Dec. 18, 1962, Ser. No. 245,398
21 Claims. (Cl. 260—293.4)

The present invention relates to a novel group of compounds which are 1-aroylpropyl-4-piperidyl derivatives of benzimidazolinones. More particularly, the present invention relates to compounds which can be represented by the following general formula

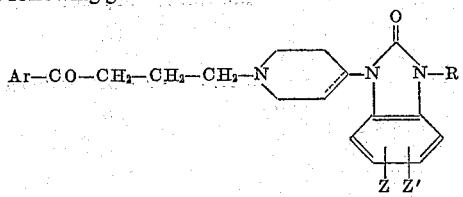

wherein Ar is selected from the group consisting of phenyl, halophenyl, methoxyphenyl, thienyl, (lower alkyl)-phenyl, and dimethylphenyl; R is selected from the group consisting of hydrogen, hydroxymethyl, lower alkyl and lower alkanoyl; Z and Z' are selected from the group consisting of hydrogen, halogen, methoxy and methyl; and the dotted line indicates that a double bond between the 3 and 4 carbon atoms of the piperidine nucleus is optional.

The lower alkyl radicals referred to above are straight- or branched-chain radicals which contain up to 6 carbon atoms and they are exemplified by radicals such as methyl, ethyl, propyl, isopropyl, butyl, amyl, and hexyl. The lower alkanoyl radicals referred to above contain up to 6 carbon atoms and are exemplified by radicals such as formyl, acetyl, propionyl, butyryl, and hexanoyl. The halophenyl radicals represented by Ar can be fluorophenyl, chlorophenyl, bromophenyl, and iodophenyl radicals.

The compounds of this invention possess useful pharmacological properties. In general terms these compounds can be said to be neuroleptics. More specifically, they are anti-apomorphine, anti-amphetamine and catalepsy-producing agents.

The organic bases of this invention form pharmaceutically acceptable salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzenesulfonate, ethyl toluenesulfonate, ethylene chlorohydrin, propylene chlorohydrin, allyl bromide, methallyl bromide, and crotyl bromide.

The compounds of this invention can be prepared by the condensation of a γ-aroylpropyl halide with an appropriately selected 1-(4-piperidyl)-2-benzimidazolinone of the formula

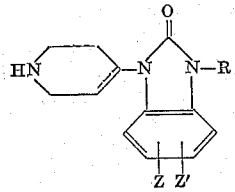

wherein R, Z, Z' and the dotted line are defined as above. The reaction can be carried out in an inert solvent such as an aromatic hydrocarbon (e.g. benzene, toluene, xylene) or a lower alkanone (e.g. acetone, butanone, pentanone or 4-methyl-2-pentanone). In certain cases the reaction may be usefully accelerated by the use of elevated temperatures. Additionally, the products where R is hydrogen can be reacted with formalin or a lower alkanoic acid anhydride to give the corresponding compounds where R is hydroxymethyl or lower alkanoyl.

To prepare the 1-(1,2,3,6-tetrahydro-4-pyridyl)-2-benzimidazolinones used above as intermediates, 1-benzyl-3-carbethoxy-2-piperidone is heated with an appropriate 1,2-phenylenediamine in an inert solvent such as xylene. This gives the 1-(1-benzyl-1,2,3,6-tetrahydro-4-pyridyl)-2-benzimidazolinone which can be reacted with an alkylating agent (e.g. sodamide followed by phenyltrimethylammonium bromide), a hydroxyalkylating agent (e.g. formalin), or an acylating agent (e.g. an acid anhydride) to give the corresponding 3-alkyl, 3-hydroxyalkyl, and 3-alkanoylbenzimidazolinone respectively. Catalytic hydrogenation removes the benzyl group to give the desired tetrahydropyridyl compound.

The compounds which constitute this invention and the methods for their preparation will appear more fully from a consideration of the following examples, which are given for the purpose of illustration only and are not to be construed as limiting the invention in spirit or in scope. In these examples, quantities are indicated in parts by weight, temperatures are expressed in degrees centigrade, and pressures are expressed in millimeters of mercury.

This is a continuation-in-part of my copending application Serial No. 161,424, filed December 22, 1961 and subsequently abandoned.

*Example I*

To a boiling mixture of 30 parts of 4,5-dimethyl-1,2-phenylenediamine in 560 parts of xylene is added portionwise a solution of 57.5 parts of 1-benzyl-3-carbethoxy-4-piperidone in 296 parts of xylene over a period of 1 hour. During the addition an equal quantity of xylene is distilled off. When the addition is complete, the mixture is stirred and refluxed for an additional hour before it is concentrated and cooled to room temperature to give 1-(1 - benzyl-1,2,3,6-tetrahydro-4-pyridyl)-5,6-dimethyl-2-benzimidazolinone melting at about 180.5–184.5° C.

A mixture of 21 parts of 1-(1-benzyl-1,2,3,6-tetrahydro-4-pyridyl)-5,6 - dimethyl-2 - benzimidazolinone in 240 parts of ethanol is hydrogenated at atmospheric pressure and at a temperature of about 50° C. in the presence of 5 parts of palladium on charcoal catalyst. Hydrogenation is stopped when one molar equivalent of hydrogen has been taken up. The catalyst is filtered off and the solvent is evaporated from the filtrate to give oily 1-(1,2,3,6-tetrahydro-4-pyridyl)-5,6 - dimethyl - 2 - benzimidazolinone. If 1-(1-benzyl-1,2,3,6-tetrahydro-4 - pyridyl)-2-benzimidazolinone is hydrogenated in a similar manner, the product is 1-(1,2,3,6-tetrahydro-4-pyridyl)-2-benzimidazolinone melting at about 184–190° C.

*Example II*

A mixture of 15.3 parts of 1-(1-benzyl-1,2,3,6-tetrahydro-4-pyridyl)-2-benzimidazolinone, and 2.4 parts of sodamide in 160 parts of toluene is refluxed until ammonia evolution ceases. The reaction mixture is cooled and there is added 10.8 parts of phenyltrimethylammonium bromide and the mixture is refluxed for 48 hours. 100 parts of water is added to the crude reaction mixture. The aqueous layer is separated and extracted three times with toluene. The combined toluene extracts are dried over magnesium sulfate. The solvent is evaporated and the oily residue is dissolved in 640 parts of diisopropyl ether and filtered. Hydrogen chloride gas is introduced to the filtrate to give the hydrochloride which is filtered off and recrystallized from ethanol. This product is 1-(1-benzyl-1,2,3,6-tetrahydro-4-pyridyl) - 3-methyl - 2 - benzimidazolinone hydrochloride melting at about 261–263.5° C.

A mixture of 11.7 parts of 1-(1-benzyl-1,2,3,6-tetrahydro-4-pyridyl)-3-methyl-2 - benzimidazolinone hydrochloride, 52 parts of acetic acid and 40 parts of absolute ethanol is hydrogenated at atmospheric pressure at the temperature of 40° C. in the presence of 3 parts of palladium on charcoal catalyst. Hydrogenation is stopped when two molar equivalents of hydrogen has been taken up. The catalyst is filtered off and the solvent is evaporated from the filtrate to give a residue which is first stirred in 40 parts of acetone and then recrystallized from 2-propanol to give 1 - (4 - piperidyl)-3-methyl-2-benzimidazolinone hydrochloride melting at about 225–230° C.

If an equivalent quantity of phenyltriethylammonium bromide is substituted for the phenyltrimethylammonium bromide and the above procedure is repeated, the product is 1-(4-piperidyl)-3-ethyl-2-benzimidazolinone.

*Example III*

A mixture of 5.5 parts of γ-chlorobutyrophenone, 5.4 parts of 1-(1,2,3,6-tetrahydro-4-pyridyl) - 2 - benzimidazolinone, 5 parts of sodium carbonate and 0.1 part of potassium iodide in 200 parts 4-methyl-2-pentanone is stirred and refluxed for 75 hours. The hot reaction mixture is filtered and the solvent is evaporated from the filtrate. The residual solid is boiled in ether and filtered and the solid is then recrystallized from 2-propanol to give 1-[1-(γ-benzoylpropyl)-1,2,3,6-tetrahydro - 4 - pyridyl]-2-benzimidazolinone melting at about 192–195° C.

This compound has the following formula

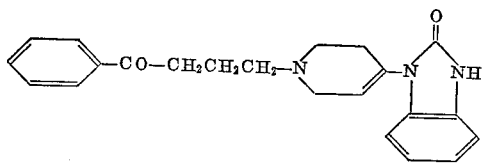

*Example IV*

A mixture of 10 parts of γ-chloro-4-fluoro-butyrophenone, 5.5 parts of 1-(1,2,3,6-tetrahydro-4-pyridyl)-2-benzimidazolinone, 4 parts of sodium carbonate, and 0.1 part of potassium iodide in 176 parts of 4-methyl-2-pentanone is stirred and refluxed for 64 hours. The cooled reaction mixture is filtered and the solvent is evaporated from the filtrate to leave an oily residue which is dissolved in toluene. The toluene solution is filtered and the solvent is evaporated. The resultant residue is recrystallized from a mixture of 32 parts of ethyl acetate and 32 parts of diisopropyl ether to give 1-{1-[γ-(4-fluorobenzoyl)propyl]-1,2,3,6-tetrahydro-4 - pyridyl} - 2-benzimidazolinone hydrate melting at about 145–146.5° C.

*Example V*

To a stirred mixture of 4.3 parts of 1-(1,2,3,6-tetrahydro-4-pyridyl)-2-benzimidazolinone, 3 parts of sodium carbonate, and 0.1 part of potassium iodide in 160 parts of 4-methyl-2-pentanone is added portionwise a solution of 3.9 parts of γ-chloro-4-methylbutyrophenone in 40 parts of 4-methyl-2-pentanone. When the addition is complete, the mixture is stirred and refluxed for 24 hours. Then there is added portionwise a solution of 3.9 parts of γ-chloro-4-methylbutyrophenone in 40 parts of 4-methyl-2-pentanone and the resultant mixture is stirred and refluxed for 40 hours. The reaction mixture is cooled, 100 parts of water is added, and the organic layer is separated, dried, and filtered. Evaporation of the solvent leaves a residue which is dissolved in 28 parts of 2-propanol. To this solution is added a solution of 2.5 parts of oxalic acid dihydrate in 16 parts of 2-propanol.

The oxalate precipitates out at −20° C. and it is triturated in boiling ethanol to give 1-{1-[γ-(4-methylbenzoyl)propyl]-1,2,3,6-tetrahydro-4 - pyridyl} - 2 - benzimidazolinone oxalate melting at about 168–203.5° C. with decomposition.

An equivalent quantity of γ-chloro-4-bromobutyrophenone is substituted for the γ-chloro-4-methylbutyrophenone and the above procedure is repeated. In this case the product is 1-{1-[γ-(4 - bromobenzoyl)propyl]-1,2,3,6 - tetrahydro - 4 - pyridyl} - 2 - benzimidazolinone oxalate hydrate melting at about 214–215° C.

Likewise, if an equivalent quantity of γ - chloro - 4-fluorobutyrophenone is substituted for the γ-chloro-4-methyl-butyrophenone and the above procedure is repeated the product is 1-{1-[γ(4-fluorobenzoyl)propyl]-1,2,3,6 - tetrahydro - 4 - pyridyl} - 2 - benzimidazolinone oxalate melting at about 175–197° C. with decomposition. In this case, ethanol is used as the solvent for the preparation of the oxalate from the crude base.

If an equivalent quantity of γ-chloro-3-fluorobutyrophenone is substituted for the γ-chloro-4-methylbutyrophenone and the above procedure is repeated, the product is 1-{1-[γ-(3-fluorobenzoyl)propyl] - 1,2,3,6 - tetrahydro-4-pyridyl}-2-benzimidazolinone oxalate.

*Example VI*

A mixture of 4.4 parts of γ-chloro-4-(t-butyl)-butyrophenone, 5.4 parts of 1-(1,2,3,6-tetrahydro-4-pyridyl)-2-benzimidazolinone, 4 parts of sodium carbonate and 0.1 part of potassium iodide in 176 parts 4-methyl-2-pentanone is stirred and refluxed for 48 hours. 100 parts of water is added to the cooled reaction mixture. The organic layer is then separated, dried over magnesium sulfate and filtered, and the solvent is evaporated. The oily residue is dissolved in 480 parts of diethyl ether and filtered from some insoluble oil and the solvent is evaporated from the filtrate. The residue is recrystallized from diethyl ether to give 1-{1-[γ-(4-t-butylbenzoyl)-propyl]-1,2,3,6 - tetrahydro-4-pyridyl}-2-benzimidazolinone melting at about 75.6–103° C.

An equivalent quantity of γ-chloro-4-isopropyl-butyrophenone is substituted for the γ-chloro-4-(t-butyl)-butyrophenone and the above procedure is repeated to give 1-{1 - [γ-(4-isopropylbenzoyl)propyl]-1,2,3,6-tetrahydro-4-pyridyl}-2-benzimidazolinone melting at about 149–152° C.

If an equivalent quantity of γ-chloro-4-ethyl-butyrophenone is substituted for the γ-chloro-4-(t-butyl)-butyrophenone and the procedure of the first paragraph is repeated, the product is 1-{1-[γ-(4-ethylbenzoyl)propyl]-1,2,3,6-tetrahydro-4-pyridyl}-2-benzimidazolinone melting at about 145.4–148.6° C. after recrystallization from acetone.

*Example VII*

A mixture of 5.5 parts of γ-chloro-4-fluorobutyrophenone, 6.5 parts of 1-(1,2,3,6-tetrahydro-4-pyridyl)-5,6-dimethyl-2-benzimidazolinone, 3.6 parts of sodium carbonate and 0.1 part of potassium iodide in 200 parts of 4-methyl-2-pentanone is stirred and refluxed for 24 hours. Then a second portion of 5.5 parts of γ-chloro-4-fluorobutyrophenone is added and the mixture is stirred and refluxed for an additional 24 hours. The resultant mixture is cooled and 150 parts of water are added. The organic layer is separated and dried and the solvent is evaporated. The solid residue is stirred in diethyl ether and filtered. Recrystallization of the solid from toluene gives 1 - {1-[γ-(4-fluorobenzoyl)propyl]-1,2,3,6-tetrahydro-4-pyridyl}-5,6-dimethyl-2-benzimidazolinone melting at about 185.6–190° C. This compound has the following formula

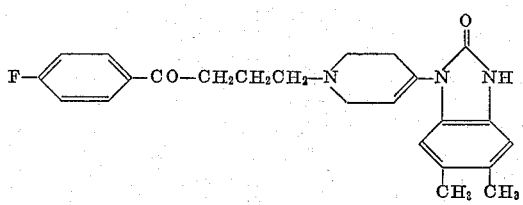

Example VIII

A mixture of 13 parts of γ,4-dichlorobutyrophenone, 5.4 parts of 1-(1,2,3,6-tetrahydro-4-pyridyl)-2-benzimidazolinone, 4 parts of sodium carbonate and 0.1 part of potassium iodide in 176 parts of 4-methyl-2-pentanone is stirred and refluxed for 48 hours. 100 parts of water is added to the cooled reaction mixture. The organic layer is separated, dried over magnesium sulfate, and the solvent is evaporated. The residue is crystallized twice from a mixture of toluene and ether to give 1-{1-[γ-(4-chloro-benzoyl)propyl]-1,2,3,6-tetrahydro-4-pyridyl}-2-benzimidazolinone melting at about 122–130° C.

Example IX

If an equivalent quantity of γ-chloro-2,5-dimethylbutyrophenone is substituted for the γ,4-dichlorobutyrophenone and the procedure of Example VIII is repeated, the product is 1-{1-[γ-(2,5-dimethylbenzoyl)propyl]-1,2,3,6-tetrahydro-4-pyridyl}-2-benzimidazolinone melting at about 111–116.2° C. after recrystallization from ether.

Example X

A mixture of 7 parts of γ-chloro-2,4-dimethylbutyrophenone, 7 parts of 1-(1,2,3,6-tetrahydro-4-pyridyl)-2-benzimidazolinone, 5 parts of sodium carbonate and 0.1 part of potassium iodide in 200 parts of 4-methyl-2-pentanone is stirred and refluxed for 24 hours. Then a second portion of 7 parts γ-chloro-2,4-dimethylbutyrophenone is added and the mixture is stirred and refluxed for an additional 24 hours. 150 parts of water is added to the cooled reaction mixture. The organic layer is then separated and dried and the solvent is evaporated from the filtrate. The residue is dissolved in 200 parts of ether and filtered and the solvent is evaporated. A solution of the residue in 2-propanol is mixed with a solution of 6 parts of oxalic acid dihydrate in 2-propanol and then cooled to room temperature. The product which is obtained is 1-{1-[γ-(2,4-dimethylbenzoyl)propyl]-1,2,3,6-tetrahydro-4-pyridyl}-2-benzimidazolinone oxalate melting at about 199–200° C.

Example XI

A mixture of 4.3 parts of γ-chloro-4-methoxybutyrophenone, 4.3 parts of 1-(1,2,3,6-tetrahydro-4-pyridyl)-2-benzimidazolinone, 3 parts of sodium carbonate, and 0.1 part of potassium iodide in 200 parts of 4-methyl-2-pentanone is stirred and refluxed for 24 hours. An additional 4.3 parts of γ-chloro-4-methoxybutyrophenone is then added and the mixture is stirred and refluxed for an additional 24 hours. The cooled reaction mixture is divided between 40 parts of water and 240 parts of ether. The organic layer is separated and dried and the solvent is evaporated to leave an oily residue which is dissolved in acetone and then mixed with a solution of 2.5 parts of oxalic acid dihydrate in 16 parts of acetone. The product which crystallizes from the solution is 1-{1-[γ-(4-methoxybenzoyl)propyl] - 1,2,3,6-tetrahydro-4-pyridyl}-2-benzimidazolinone oxalate melting at about 149–169° C. with decomposition.

Example XII

A mixture of 13.2 parts of γ-chloro-3,4-dimethylbutyrophenone, 6.5 parts of 1-(1,2,3,6-tetrahydro-4-pyridyl)-2-benzimidazolinone, 5 parts of sodium carbonate, and 0.1 part of potassium iodide in 200 parts of 4-methyl-2-pentanone is stirred and refluxed for 48 hours. The reaction mixture is filtered and the solvent is evaporated from the filtrate. The residue is dissolved in 240 parts of ether and filtered and the filtrate is concentrated to a small volume and cooled. The solid which precipitates is recrystallized from a mixture of 2-propanol and ether to give a product which is dissolved in 2-propanol and mixed with a solution of 0.6 part of oxalic acid dihydrate in 28 parts of 2-propanol. On cooling the 2-propanol solution to room temperature, there is obtained 1 - {1 - [γ - (3,4 - dimethylbenzoyl)propyl] - 1,2,3,6-tetrahydro - 4 - pyridyl] - 2 - benzimidazolinone oxalate hydrate melting at about 150–184° C. with decomposition.

Example XIII

A mixture of 5.5 parts of γ-chloro-4-methylbutyrophenone, 3 parts of 1-(4-piperidyl)-2-benzimidazolinone, 10 parts of sodium carbonate, and 0.1 part of potassium iodide in 200 parts of 4-methyl-2-pentanone is stirred and refluxed for 72 hours. The reaction mixture is cooled and 100 parts of water is added. The separated organic layer is dried over magnesium sulfate and the solvent is then evaporated. The residue is dissolved in 5 parts of 12 N hydrochloric acid and 200 parts of water is added. The resultant solution is washed with toluene, alkalized with ammonium hydroxide, and then extracted with toluene. This extract is then dried and the solvent is evaporated to leave a residue which is crystallized twice from ether to give 1 - {1 - [γ - (4 - methylbenzoyl)-propyl] - 4 - piperidyl} - 2 - benzimidazolinoine melting at about 162.4–168° C.

If an equivalent quantity of γ-chloro-4-methoxybutyrophenone is substituted for the γ-chloro-4-methylbutyrophenone and the above procedure is repeated the product is 1-{1-[γ-(4-methoxybenzoyl)propyl]-4-piperidyl}-2-benzimidazolinone melting at about 155–180° C.

5.5 parts of γ-chloro-2-methylbutyrophenone is substituted for the γ-chloro-4-methylbutyrophenone and the above procedure is repeated to give 1-{1-[γ-(2-methylbenzoyl)propyl]-4-piperidyl}-2-benzimidazolinone.

Example XIV

A mixture of 3.4 parts of γ-chloro-4-fluorobutyrophenone, 4 parts of 1-(4-piperidyl)-2-benzimidazolinone hydrochloride, 6 parts of sodium carbonate and 0.1 part of potassium iodide in 176 parts of 4-methyl-2-pentanone is stirred and refluxed for 48 hours. The reaction mixture is cooled and 120 parts of water is added. The separated organic layer is dried over magnesium sulfate and the solvent is evaporated to leave an oily residue which is dissolved in dilute hydrochloric acid and boiled. The acidic solution is filtered and cooled to room temperature whereupon there crystallizes from solution 1-{1-[γ - (4 - fluorobenzoyl)propyl] - 4 - piperidyl} - 2 - benzimidazolinone hydrochloride hydrate melting at about 134–142° C.

If 3.4 parts of γ-chloro-3-fluorobutyrophenone is substituted for the 3.4 parts of γ-chloro-4-fluorobutyrophenone and the above procedure is repeated, the product is 1 - {1 - [γ - (3 - fluorobenzoyl)propyl] - 4 - piperidyl}-2-benzimidazolinone hydrochloride. The free base of this compound has the following formula

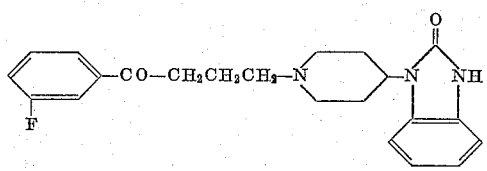

Example XV

To a stirred mixture of 15.2 parts of 1-(4-piperidyl)-2-benzimidazolinone, 22.3 parts of sodium carbonate, and 0.1 part of potassium iodide and 320 parts of 4-methyl-2-pentanone is added portionwise a solution of 39 parts of γ-chloro-4-fluorobutyrophenone in 80 parts of 4-methyl-2-pentanone. The resultant mixture is stirred and refluxed for 95 hours. The hot mixture is filtered and the solvent is evaporated from the filtrate to leave a solid residue which is stirred in diisopropyl ether and then recrystallized from toluene to give 1-{1-[γ-(4-fluorobenzoyl)propyl] - 4 - piperidyl} - 2 - benzimidazolinone melting at about 170–171.8° C.

An equivalent quantity of γ,4-dichlorobutyrophenone is substituted for the γ-chloro-4-fluorobutyrophenone and the above procedure is repeated. The crude product is obtained as an oily residue which is dissolved in toluene and filtered several times. The toluene solvent is then evaporated and the remaining oily residue is recystallized from acetone to give 1-{1-[γ-(4-fluorobenzoyl)propyl] - 4 - piperidyl} - 2 - benzimidazolinone melting at about 188.5–195° C.

*Example XVI*

A mixture of 7 parts of γ-chloro-2,4-dimethylbutyrophenone, 7 parts of 1-(4-piperidyl)-2-benzimidazolinone, 5 parts of sodium carbonate and 0.1 part of potassium iodide in 200 parts of 4-methyl-2-pentanone is stirred and refluxed for 24 hours. Then a second portion of 7 parts of γ-chloro-2,4-dimethylbutyrophenone is added and the mixture is stirred and refluxed for an additional 24 hours. After the reaction mixture has cooled, 150 parts of water is added. The organic layer is then separated and dried and the solvent is evaporated from the filtrate to leave an oily residue which is dissolved in 200 parts of ether. The ether solution is filtered and the solvent is then evaporated. The resultant oily residue is dissolved in 2-propanol and mixed with a hot solution of 7 parts of oxalic acid dihydrate in 2-propanol. The resultant mixture is cooled to room temperature and filtered to give 1 - {1 - [γ - (2,4 - dimethylbenzoyl)propyl] - 4 - piperidyl}-2-benzimidazolinone oxalate melting at about 212–214.5° C.

If an equivalent quantity of γ-chloro-2,5-dimethylbutyrophenone is substituted for the γ-chloro-2,4-dimethyl-butyrophenone and the above procedure is repeated, the product is 1-{1-[γ-(2,5-dimethylbenzoyl)-propyl] - 2 - piperidyl} - 2 - benzimidazolinone oxalate melting at about 173–175° C. with decomposition.

*Example XVII*

To a stirred mixture of 5 parts of 1-(4-piperidyl)-2-benzimidazolinone, 7.3 parts of sodium carbonate and 0.1 part of potassium iodide in 136 parts of 4-methyl-2-pentanone is added portionwise a solution of 5.1 parts of γ-chloro-butyrophenone and 24 parts of 4-methyl-2-pentanone. When the addition is complete, the mixture is stirred and refluxed for 60 hours. 100 parts of water is added to the cooled reaction mixture. The aqueous layer is separated and extracted once with 4-methyl-2-pentanone. The combined organic layers are dried over magnesium sulfate and the sovent is evaporated to leave an oily residue. This residue is dissolved in 100 parts of water and acidified with 3 parts of concentrated hydrochloric acid to give a sticky precipitate. The aqueous layer is decanted and the residue is triturated in acetone to give 1 - [1-(γ-benzoylpropyl)-4-piperidyl]-2-benzimidazolinone hydrochloride dihydrate melting at about 138–216° C. with decomposition.

*Example XVIII*

A mixture of 12.6 parts of γ-chloro-4-ethylbutyrophenone, 5 parts of 1-(4-piperidyl)-2-benzimidazolinone, 4 parts of sodium carbonate, and 0.1 part of potassium iodide and 200 parts of 4-methyl-2-pentanone is stirred and refluxed for 48 hours. The hot reaction mixture is filtered and the solvent is evaporated from the filtrate to leave a residue which is dissolved in 80 parts of ether. The ether solution is filtered and kept at room temperature. A precipitate forms. This solid is recrystallized from acetone to give 1-{1-[γ-(4-ethylbenzoyl)propyl]-4-piperidyl}-2-benzimidazolinone melting at about 149–150° C.

*Example XIX*

A mixture of 13.44 parts of γ-chloro-4-isopropylbutyrophenone, 5.4 parts of 1-(4-piperidyl)-2-benzimidazolinone, 4 parts of sodium carbonate, and 0.1 part of potassium iodide in 176 parts of 4-methyl-2-pentanone is stirred and refluxed for 48 hours. The reaction mixture is allowed to cool and 100 parts of water is added. The aqueous layer is separated and extracted once with 40 parts of toluene. The combined organic layers are dried over magnesium sulfate and cooled to −15° C. to give 1-{1-[γ-(4-isopropylbenzoyl)-propyl]-4-piperidyl} - 2 - benzimidazolinone melting at about 165.8–174° C.

*Example XX*

A mixture of 14.4 parts of γ-chloro-4-(t-butyl)-butyrophenone, 5.4 parts of 1-(4-piperidyl)-2-benzimidazolinone, 4 parts of sodium carbonate, and 0.1 part of potassium iodide in 176 parts of 4-methyl-2-pentanone is stirred and refluxed for 48 hours. The reaction mixture is cooled and 100 parts of water is added. The organic layer is then separated and dried over magnesium sulfate and the solvent is evaporated. A solution of the residue in 400 parts of toluene is filtered to remove insoluble oil and the solvent is evaporated from the filtrate. The residue is crystallized first from a mixture of 32 parts of toluene and 32 parts of ether and then recrystallized from the mixture of 2-propanol and ether to give 1-{1-[γ-(4-t-butylbenzoyl) - propyl]-4-piperidyl}-2-benzimidazolinone dihydrate melting at about 104.2–122° C. with decomposition.

*Example XXI*

To a stirred mixture of 6.5 parts of 1-(4-piperidyl)-2-benzimidazolinone, 4.8 parts of sodium carbonate and 0.1 part of potassium iodide in 136 parts of 4-methyl-2-pentanone is added portionwise a solution of 7.6 parts of γ-chloro-3,4-dimethylbutyrophenone in 24 parts of 4-methyl-2-pentanone. The resultant mixture is stirred and refluxed for 24 hours before an additional 7.6 parts of γ-chloro-3,4-dimethylbutyrophenone is added portionwise to the mixture. This mixture is stirred and refluxed for 48 hours. 100 parts of water is added to the cooled reaction mixture and the aqueous layer is separated and extracted once with 4-methyl-2-pentanone. The combined organic layers are dried over magnesium sulfate and the solvent is evaporated. The oily residue is dissolved in ether and cooled to −15° C. The insoluble oil which first forms solidifies on standing. The resultant solid is then recrystallized from 4-methyl-2-pentanone to give 1-{1-[γ-(3,4-dimethylbenzoyl)-propyl]-4-piperidyl}-2-benzimidazolinone melting at about 132–133.4° C.

*Example XXII*

A mixture of 7.8 parts of γ-chloro-4-bromobutyrophenone, 5 parts of 1-(4-piperidyl)-2-benzimidazolinone, 4 parts of sodium carbonate and 0.1 part of potassium iodide in 200 parts of 4-methyl-2-pentanone is stirred and refluxed for 24 hours. A second portion of 7.8 parts of γ-chloro-4-bromobutyrophenone is added and stirring and refluxing is continued for an additional 24 hours. The hot reaction mixture is filtered and the solvent is evaporated from the filtrate. The solid residue is washed with ether and then recrystallized from acetone to give 1-{1-[γ-(4-bromobenzoyl)propyl]-4-piperidyl} - 2 - benzimidazolinone melting at about 200–203° C.

*Example XXIII*

A mixture of 5.3 parts of 2-(γ-chlorobutyryl)-thiophene, 5 parts of 1-(4-piperidyl)-2-benzimidazolinone, 5 parts of sodium carbonate and 0.1 part of potassium iodide in 200 parts of 4-methyl-2-pentanone is stirred and refluxed for 70 hours. The reaction mixture is cooled and 100 parts of water is added. The organic layer is separated and the solvent is evaporated to leave a residue which is recrystallized first from ethyl acetate and then from 2-propanol to give 1-{1-[γ-(2-thenoyl)propyl]-4-piperidyl}-2-benzimidazolinone melting at about 172.5–177° C. This compound has the following formula

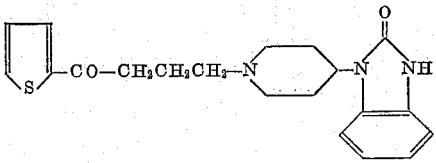

Example XXIV

To a stirred mixture of 5.4 parts of 1-(4-piperidyl)-3-methyl-2-benzimidazolinone, 8.5 parts of sodium carbonate and 0.1 part of potassium iodide and 136 parts of 4-methyl-2-pentanone is added portionwise a solution of 5 parts of γ-chloro-4-fluorobutyrophenone in 24 parts of 4-methyl-2-pentanone. When the addition is complete, the resultant mixture is stirred and refluxed for 16 hours. The hot reaction mixture is filtered and the solvent is evaporated from the filtrate to leave an oily residue which is dissolved in 280 parts of ether. The ether solution is filtered and hydrogen chloride gas is introduced into it. The precipitated hydrochloride is filtered off and recrystallized from a mixture of ethanol and 2-propanol to give 1-{1-[γ-(4-fluorobenzoyl)propyl]-4-piperidyl}-3 - methyl-2-benzimidazolinone hydrochloride melting at about 263–266° C.

If an equivalent quantity of 1-(4-piperidyl)-3-ethyl-2-benzimidazolinone is substituted for the 1-(4-piperidyl)-3-methyl-2-benzimidazolinone and the above procedure is repeated, the product is 1-{1-[γ-(4-fluorobenzoyl)propyl]-4-piperidyl}-3-ethyl-2-benzimidazolinone hydrochloride.

Example XXV

A mixture of 3 parts of 1-{1-[γ-(4-fluorobenzoyl)propyl]-4-piperidyl}-2-benzimidazolinone, 5 parts of 38% formalin and 32 parts of 2-propanol is stirred and refluxed for 2 hours. When the reaction mixture is cooled, a solid precipitates. This is filtered off to give 1-{1-[γ-(4-fluorobenzoyl)propyl]-4-piperidyl}-3-hydroxymethyl - 2 - benzimidazolinone melting at about 162–165° C.

Example XXVI

A mixture of 5 parts of 1-{1-[γ-(4-fluorobenzoyl)propyl]-4-piperidyl}-2-benzimidazolinone, 7 parts of acetic acid anhydride and 40 parts of benzene is refluxed for 3.5 hours. The reaction mixture is cooled and the solvent and excess anhydride is evaporated. The residue is dissolved in water and ice is added. The resultant mixture is alkalized with ammonium hydroxide and extracted with chloroform. The chloroform solution is dried over magnesium sulfate and the solvent is evaporated to leave an oily residue which crystallizes from ether to give 1-{1-[γ-(4-fluorobenzoyl)propyl]-4-piperidyl}-3-acetyl - 2 - benzimidazolinone melting at about 107.5–119° C.

If an equivalent quantity of propionic acid anhydride is substituted for the acetic acid anhydride and the above procedure is repeated, the product is 1-{1-[γ-(4-fluorobenzoyl)propyl]-4-piperidyl}-3-propionyl - 2 - benzimidazolinone melting at about 118.8–119.8° C.

Example XXVII

A mixture of 20 parts of 1-{1-[γ-(4-fluorobenzoyl)propyl]-1,2,3,6-tetrahydro-4-pyridyl} - 2 - benzimidazolinone, 50 parts formalin 37% and 200 parts of 2-propanol is stirred and refluxed for 20 hours. After cooling, the reaction mixture is diluted with 500 parts water. This aqueous solution is extracted with 600 parts chloroform. The organic layer is dried over sodium carbonate and evaporated. The oily residue is triturated in a mixture of 400 parts diisopropylether and 80 parts acetone. The solid precipitate is filtered off (2.3 parts mainly unreacted "1-{1-[γ-(4-fluorobenzoyl)propyl]-1,2,3,6-tetrahydro - 4 - pyridyl}-2-benzimidazolinone") and in the mother liquor gaseous hydrogen chloride is introduced into it: a semi-solid precipitate is obtained. It is filtered off and the filtrate is evaporated. The whole (semi-solid hydrochloride and residue) is dissolved in 120 parts boiling 2-propanol. The solution is filtered and after cooling the filtrate to room temperature, 1-{1-[γ-(4-fluorobenzoyl)propyl]-1,2,3,6-tetrahydro-4-pyridyl}-3-hydroxymethyl - 2 - benzimidazolinone hydrochloride is obtained melting at about 175–233° C. with decomposition.

Example XXVIII

A mixture of 15 parts 1-{1-[γ-(4-fluorobenzoyl)propyl]-1,2,3,6-tetrahydro-4-pyridyl} - 2 - benzimidazolinone, 19.3 parts acetic acid anhydride and 200 parts anhydrous toluene is refluxed for 6 hours. After cooling, 150 parts water are added. The whole is alkalized with ammonium hydroxide and extracted with toluene. The organic layer is separated, dried over potassium carbonate, filtered and evaporated. The solid residue is washed with a mixture of 40 parts diisopropyl ether and 8 parts acetone, filtered off again and dried, yielding 10.5 parts crude product. This crop is first dried for 2 days at 80° C. and then recrystallized from a mixture of 60 parts diisopropyl ether and 16 parts acetone. After cooling overnight at 0° C., 1-{1-[γ-(4-fluorobenzoyl)propyl] - 1,2,3,6 - tetrahydro-4-pyridyl}-3-acetyl-2-benzimidazolinone is obtained melting at about 136–137° C.

Example XXIX

To a stirred mixture of 10.8 parts 1-(1,2,3,6-tetrahydro-4-pyridyl)-2-benzimidazoline, 10.6 parts sodium carbonate, a few crystals of potassium iodide in 340 parts 4-methyl-2-pentanone is added dropwise a solution of 9.3 parts 2-(γ-chlorobutyryl)-thiophene in 40 parts 4-methyl-2-pentanone. After the addition is complete, the whole is stirred and refluxed for 24 hours. Then a second portion of 9.3 parts 2-(γ-chlorobutyryl)-thiophene dissolved in 40 parts 4-methyl-2-pentanone is added dropwise. After the addition is complete, the whole is stirred and refluxed for 40 hours. After cooling, 70 parts water are added. The organic layer is separated, dried over potassium carbonate, filtered and evaporated. The oily residue is treated with 400 parts anhydrous toluene. The whole is filtered and the filtrate is evaporated. The semi-solid residue is dissolved in 56 parts boiling ethanol and filtered. After cooling the filtrate overnight at −20° C., 12.7 parts product are obtained. This crop is recrystallized once more from 72 parts boiling ethanol. After cooling the filtrate overnight at 0° C., a first crop of crude 1-{-[γ-(2-thenoyl)propyl]-1,2,3,6-tetrahydro-4-pyridyl}-2 - benzimidazolinone is filtered off. After further cooling of the filtrate at −20° C., a second crop of 4.4 parts product is obtained. The combined fractions are recrystallized from 120 parts boiling ethyl acetate. After cooling overnight at 0° C., 1-{1-[γ-(2-thenoyl)propyl]-1,2,3,6-tetrahydro-4-pyridyl}-2-benzimidazolinone is filtered off melting at about 154.8–156.2° C.

On further cooling the mother liquor for 5 hours at −20° C., a second pure fraction of 1-{1-[γ-(2-thenoyl) propyl]-1,2,3,6-tetrahydro - 4 - pyridyl}-2-benzimidazolinone is filtered off melting at about 153.4–155° C.

Example XXX

A mixture of 15 parts 1-{1-[γ-(4-fluorobenzoyl)propyl] - 1,2,3,6-tetrahydro-4-pyridyl} - 2-benzimidazolinone 24.18 parts propionic acid anhydride and 200 parts anhydrous toluene is stirred and refluxed for 6 hours. The reaction mixture is evaporated. The only residue is dissolved in about 120 parts diisopropyl ether. After cool ing for 2 days at 0° C., 5.5 parts product are filtered off. This crop is recrystallized from 160 parts diisopropyl ether. After cooling for 2 days at 0° C., 1-{1-[γ-(4-fluorobenzoyl) - propyl]-1,2,3,6-tetrahydro-4-pyridyl}-3-propionyl-2-benzimidazolinone is obtained melting at about 95.4–97.6° C.

*Example XXXI*

A mixture of 9.9 parts 1-{1-[γ-(4-fluorobenzoyl)propyl] - 1,2,3,6-tetrahydro-4-pyridyl}-2-benzimidazolinone, 2.4 parts sodamide and 120 parts anhydrous toluene is stirred and refluxed until no more ammonia gas is evolved (in the course of about 2h.30). Then 5.4 parts phenyltrimethylammonium bromide are added. After the addition is complete, the whole is stirred and refluxed for 40 hours. After cooling 100 parts water are added. The aqueous layer is separated and extracted twice with toluene. The combined organic layers are dried over magnesium sulfate and evaporated. The oily residue is dissolved in a mixture of 80 parts acetone and 320 parts diisopropyl ether and gaseous hydrogen chloride is introduced into the solution: a sticky hydrochloride is obtained. The acid etheric layer is decanted and evaporated. The whole (residue and sticky hydrochloride) is dissolved in a boiling mixture of 80 parts 2-propanol and 40 parts acetone. After cooling overnight at —20° C., 1-{1-[γ-(4-fluorobenzoyl)propyl] - 1,2,3,6 - tetrahydro-4-pyridyl}-3-methyl-2-benzimidazolinone hydrochloride is obtained melting at about 227–230.1° C.

*Example XXXII*

To a solution of 15.3 parts 1-(1-benzyl-1,2,3,6-tetrahydro-4-pyridyl)-2-benzimidazolinone in 80 parts anhydrous benzene is added dropwise a solution of 4 parts acetylchloride in 16 parts anhydrous benzene. After the addition is complete, the mixture is stirred and refluxed for two hours in a steam bath. The formed precipitate is filtered off, boiled in 2-butanone and filtered off again, yielding 12.5 parts crude 1-(1-benzyl-1,2,3,6-tetrahydro-4 - pyridyl)-3-acetyl-2-benzimidazolinone hydrochloride. This fraction is recrystallized from 280 parts boiling 2-propanol. The undissolved part is filtered hot, yielding a first fraction of 1-(1-benzyl-1,2,3,6-tetrahydro-4-pyridyl)-3-acetyl-2-benzimidazolinone hydrochloride melting at about 244.5–248° C.

After cooling the mother liquor at —15° C. a second pure fraction of 1-(1-benzyl-1,2,3,6-tetrahydro-4-pyridyl)-3-acetyl-2-benzimidazolinone hydrochloride is obtained melting at about 238–244° C.

*Example XXXIII*

A solution of 12.8 parts 1-(1-benzyl-1,2,3,6-tetrahydro-4-pyridyl)-3-acetyl-2-benzimidazolinone hydrochloride in 160 parts ethanol (den.) is hydrogenated in the presence of 4 parts palladium on charcoal catalyst at normal pressure and at a temperature of about 40–45° C. After the calculated amount of two moles hydrogen has been absorbed, the hydrogenation is stopped. The catalyst is removed by filtration and the filtrate is evaporated. The solid residue is triturated in 40 parts acetone. The mixture is filtered to yield 7.8 parts of the crude hydrochloride. This salt is dissolved in 50 parts water. The aqueous solution is rendered alkaline by addition of ammonium hydroxide. The whole is then extracted several times with chloroform. The combined extracts are dried over magnesium sulfate, filtered and evaporated. On adding diisopropyl ether to the oily residue a solid is obtained. This is filtered and dried to yield 5.7 parts 1-(4-piperidyl)-3-acetyl-2-benzimidazolinone melting at about 176–180° C.

*Example XXXIV*

A mixture of 5.5 parts of γ-chloro-4-fluorobutyrophenone, 6.5 parts of 1-(4-piperidyl)-3-acetyl-2-benzimidazolinone, 3.6 parts of sodium carbonate and 0.1 part of potassium iodide in 200 parts 4-methyl-2-pentanone is stirred and refluxed for 24 hours. Then a second portion of 5.5 parts of γ-chloro-4-fluorobutyrophenone is added and the mixture is stirred and refluxed for an additional 24 hours. The reaction mixture is cooled and 120 parts of water is added. The organic layer is separated, dried over magnesium sulfate and filtered. From the filtrate the solvent is evaporated. On adding diisopropyl ether to the oily residue a solid is obtained. This is filtered and dried to yield 2.1 parts 1-{1-[γ-(4-fluorobenzoyl)propyl]-4-piperidyl}-3-acetyl-2-benzimidazolinone melting at about 110.5–118° C. with decomposition.

*Example XXXV*

To a mixture of 260 parts 1-(1-benzyl-1,2,3,6-tetrahydro-4-pyridyl)-2-benzimidazolinone and 2000 parts 2-propanol are added 450 parts formaline 37%. After the addition is complete, the whole is stirred and refluxed for 18 hours. After cooling, the reaction mixture is filtered and filtrate is evaporated, yielding 1-(1-benzyl-1,2,3,6-tetrahydro-4-pyridyl) - 3 - hydroxymethyl-2-benzimidazolinone melting at about 149–150.2° C.

*Example XXXVI*

A solution of 8 parts 1-(1-benzyl-1,2,3,6-tetrahydro-4-pyridyl)-3-hydroxymethyl-2-benzimidazolinone in 100 parts acetic acid and 15 parts of water is hydrogenated in the presence of 5 parts of a 10% palladium on charcoal catalyst under normal pressure and at a temperature of about 30° C. After the calculated amount of two moles of hydrogen has been absorbed, the hydrogenation is stopped. The catalyst is removed by filtration and the filtrate is concentrated under diminished pressure (bath temperature between 45 and 50° C.). The remaining solution is diluted with water and the whole is rendered alkaline with ammonium hydroxide, whereupon a solid is precipitated. This solid is extracted with chloroform and the obtained solution is dried over sodium sulfate. After filtering, the solution is evaporated. The solid residue is dissolved in a mixture of diisopropyl ether and acetone and then gaseous hydrogen chloride is introduced into this solution. The precipitated solid is filtered off to give 1 - (4-piperidyl) - 3 - hydroxymethyl-2-benzimidazolinone hydrochloride melting at about 238–271° C. with decomposition.

*Example XXXVII*

A mixture of 5.5 parts of γ-chloro-4-fluorobutyrophenone, 3.6 parts 1-(4-piperidyl)-3-hydroxymethyl-2-benzimidazolinone hydrochloride, 4 parts of sodium carbonate, 0.1 part of potassium iodide in 100 parts 4-methyl-2-pentanone is stirred and refluxed for 48 hours. The reaction mixture is cooled and filtered and the solvent is evaporated from the filtrate. The oily residue is triturated in 50 parts 2-propanol. The obtained solid is filtered off and dried to give 1.6 parts 1-{1-[γ-(4-fluorobenzoyl) propyl] - 4 - piperidyl} - 3 - hydroxymethyl-2-benzimidazolinone melting at about 160–163° C.

What is claimed is:

1. A compound of the formula

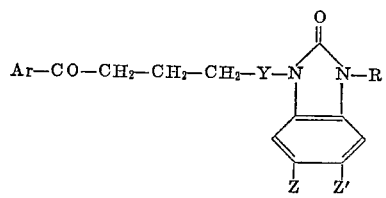

wherein Ar is selected from the group consisting of phenyl, halophenyl, methoxyphenyl, thienyl, (lower alkyl)phenyl, and dimethylphenyl; R is selected from the group consisting of hydrogen, hydroxymethyl, lower alkyl, and lower alkanoyl; Z and Z' are the same and are selected from the group consisting of hydrogen and methyl; and Y is a member selected from the group consisting of

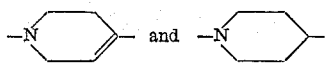

the nitrogen atom of the ring being attached to the carbon atom of the propyl function.

2. A compound of the formula

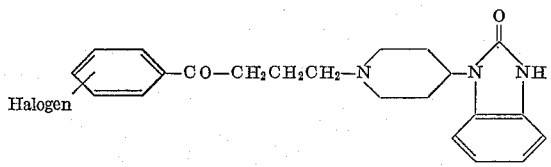

3. 1 - {1 - [γ - (4 - fluorobenzoyl)propyl] - 4 - piperidyl}-2-benzimidazolinone.

4. A compound of the formula

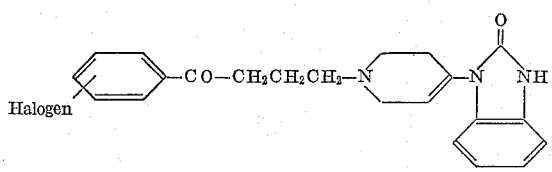

5. 1 - {1 - [γ-(4-fluorobenzoyl)propyl] - 1,2,3,6 - tetrahydro-4-pyridyl}-2-benzimidazolinone.

6. A compound of the formula

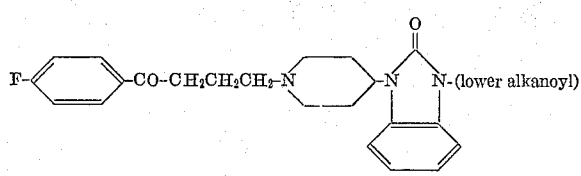

7. 1 - {1 - [γ-(4-fluorobenzoyl)propyl] - 4 - piperidyl}-3-acetyl-2-benzimidazolinone.

8. 1 - {1 - [γ-(4-fluorobenzoyl)propyl] - 4 - piperidyl}-3-propionyl-2-benzimidazolinone.

9. A compound of the formula

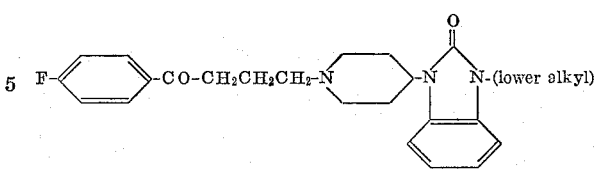

10. 1 - {1 - [γ - (4 - fluorobenzoyl)propyl] - 4 - piperidyl}-3-methyl-2-benzimidazolinone.

11. A compound of the formula

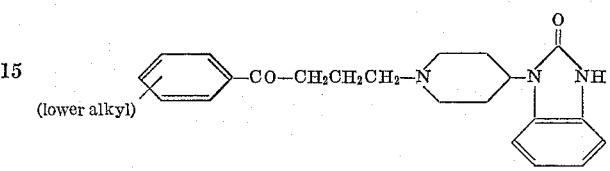

12. 1 - {1 - [γ-(4-methylbenzoyl)propyl] - 4 - piperidyl}-2-benzimidazolinone.

13. 1 - [1 - (γ - benzoylpropyl) - 4 - piperidyl] - 2-benzimidazolinone.

14. 1 - {1 - [γ - (4 - fluorobenzoyl)propyl] - 4 - piperidyl}-3-hydroxymethyl-2-benzimidazolinone.

15. 1 - {1 - [γ - (2 - thenoyl)propyl] - 4 - piperidyl}-2-benzimidazolinone.

16. 1 - [1 - (γ - benzoylpropyl) - 1,2,3,6 - tetrahydro-4-pyridyl]-2-benzimidazolinone.

17. 1 - {1 - [γ - (4 - fluorobenzoyl)propyl] - 1,2,3,6-tetrahydro - 4 - pyridyl} - 3 - hydroxymethyl - 2 - benzimidazolinone hydrochloride.

18. 1 - {1 - [γ-(4-fluorobenzoyl)propyl] - 1,2,3,6-tetrahydro-4-pyridyl}-3-acetyl-2-benzimidazolinone.

19. 1 - {1 - [γ-(2-thenoyl)propyl]-1,2,3,6-tetrahydro-4-pyridyl}-2-benzimidazolinone.

20. 1 - {1 - [γ-(4-fluorobenzoyl)propyl]-1,2,3,6-tetrahydro-4-pyridyl}-3-propionyl-2-benzimidazolinone.

21. 1 - {1 - [γ-(4-fluorobenzoyl)propyl]-1,2,3,6-tetrahydro - 4 - pyridyl} - 3 - methyl - 2 - benzimidazolinone hydrochloride.

No references cited.